United States Patent
Lindeborg et al.

(10) Patent No.: US 6,857,027 B1
(45) Date of Patent: Feb. 15, 2005

(54) INTELLIGENT NETWORK TOPOLOGY AND CONFIGURATION VERIFICATION USING A METHOD OF LOOP DETECTION

(75) Inventors: Carl John Lindeborg, Shrewsbury, MA (US); Mark David Moreau, New Bedford, MA (US); Keith Louis Petry, Southborough, MA (US); John Ernest Ziegler, Westborough, MA (US)

(73) Assignee: 3Com Corporation, Santa Clara, CA (US)

( * ) Notice: Subject to any disclaimer, the term of this patent is extended or adjusted under 35 U.S.C. 154(b) by 836 days.

(21) Appl. No.: 09/712,610

(22) Filed: Nov. 14, 2000

(51) Int. Cl.[7] .......................... G06F 15/173; G06F 15/16
(52) U.S. Cl. ........................ 709/239; 709/224; 709/238; 709/249
(58) Field of Search ................................ 709/239, 249, 709/224, 225, 238; 370/256, 396, 401, 408

(56) References Cited

U.S. PATENT DOCUMENTS

| | | | | |
|---|---|---|---|---|
| 6,023,563 A | * | 2/2000 | Shani | 709/249 |
| 6,032,194 A | * | 2/2000 | Gai et al. | 709/239 |
| 6,081,512 A | * | 6/2000 | Muller et al. | 370/256 |
| 6,304,575 B1 | * | 10/2001 | Carroll et al. | 370/408 |
| 6,343,330 B1 | * | 1/2002 | Khanna et al. | 709/249 |
| 6,545,982 B1 | * | 4/2003 | Murthy et al. | 370/401 |
| 6,560,229 B1 | * | 5/2003 | Kadambi et al. | 370/396 |
| 6,563,832 B1 | * | 5/2003 | Stuart et al. | 370/408 |
| 6,580,715 B1 | * | 6/2003 | Bare | 370/396 |

\* cited by examiner

Primary Examiner—Le Hien Luu
Assistant Examiner—Quang N. Nguyen
(74) Attorney, Agent, or Firm—Weingarten, Schurgin, Gagnebin & Lebovici LLP

(57) ABSTRACT

A system and method are disclosed for detecting and preventing bridge loops in a relatively low cost bridge module designed for installation in a network hub. The bridge operates to monitor an intra-hub communication path of the network hub to detect bridge protocol data units transmitted by a switching fabric within the network hub. The bridge module stores a MAC source address of a bridge protocol data unit detected on the intra-hub communications path, and forwards the bridge protocol data unit through its external communication ports to respective network segments. The bridge module monitors its external communication ports for any data unit having a destination address matching a bridge multicast address. When a data unit having a destination address matching the bridge multicast address is detected, the bridge module compares the MAC source address of that data unit to the previously stored MAC source address from the bridge protocol data unit detected on the intra-hub communication path. In the event that the MAC source address of the data unit detected on the external communication port matches the previously stored MAC source address, the bridge module disables operation of the respective one of its external communication ports at which the data unit was received. In one embodiment of the disclosed system, the bridge module further monitors its external communications ports for routing protocol messages. In the event that a routing protocol message is detected on one of those external communications ports, the bridge module disables that port.

24 Claims, 2 Drawing Sheets

INTELLIGENT NETWORK TOPOLOGY AND CONFIGURATION VERIFICATION USING A METHOD OF LOOP DETECTION

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to configuring the topology of a communications network, and more specifically to a system and method for detecting and eliminating network loops connected to a bridge device installed in a networking hub.

As it is generally known, in a local area network (LAN) using a protocol such as Ethernet or Token Ring, devices referred to as "nodes" compete for the ability to use a shared communications path to exchange messages referred to as "data units" or "frames." However, if too many nodes consistently attempt to transmit simultaneously, the overall performance of the network may potentially be affected, even to the point of bringing communications over the network to a near halt. To make this possibility less likely, large LANs are often divided into two or more LAN segments connected by one or more networking devices referred to as "bridges." In such a configuration, each data unit is received by any bridge or bridges connected to the LAN segment on which the data unit originated. Each bridge then determines which segment or segments the received data unit should be forwarded to, and only forwards the data unit to that segment or segments. In this way, data units transmitted between nodes within a single segment are isolated from other segments, thus reducing traffic on those other segments.

A bridge determines which LAN segments to forward a received data unit onto based on destination address information within the data unit and a data structure reflecting the locations of nodes within the various interconnected LAN segments, referred to as the forwarding table or forwarding tables of the bridge. Each bridge learns where specific nodes are located by examining the MAC source addresses of data units it receives, and by forming associations between those MAC source addresses and the segments on which the data units containing them were received. In the case where a data unit is received having a destination address for which no destination segment is known, a bridge typically broadcasts that data unit onto all segments to which it is connected, to ensure that the data unit is received at its intended destination node. This approach is generally referred to as "transparent bridging", which is performed by a "learning bridge." Transparent bridging is advantageous in that it does not require setup of the forwarding tables by a network administrator.

A known problem relating to the use of bridge technology is the need to avoid what are referred to as "broadcast storms." Broadcast storms may occur when bridges are connected in a physical loop, which results in a logical loop sometimes referred to as a "bridge loop." A bridge loop occurs when data units can travel from a first LAN segment to a second LAN segment through more than one path. In order to eliminate bridge loops, existing bridge devices typically employ a technique referred to as the spanning tree algorithm. The spanning tree algorithm is implemented by bridges interchanging special messages known as Bridge Protocol Data Units ("BPDUs"). The specific format of BPDUs is described in IEEE 802.1. The spanning tree algorithm calls for various specific types of BPDUs to be sent by bridges to a special multicast address that is received by all bridges.

The spanning tree algorithm includes steps to (1) elect a single bridge from the connected bridges to be the "root" bridge, (2) calculate a best path distance to the "root" bridge from each other bridge, (3) identify a "designated bridge" for each LAN segment that will be used for forwarding packets towards the root bridge, (4) choose a port on each bridge that gives the best path towards the root, and (5) select ports to be included within the spanning tree. Using the bridge elected as a root bridge for reference, the spanning tree algorithm operates to switch one of any two bridges forming a physical loop in the network into a standby mode, so that only one side of a potential bridge loop passes traffic. By listening to configuration update BPDUs, a bridge in the standby mode can switch automatically from standby mode into forwarding mode in the event that the other bridge forming the physical loop fails. The spanning tree protocol thus ensures that physical loops in the network topology do not result in logical looping of network traffic.

While the spanning tree algorithm has proven generally effective in eliminating bridge loops, implementing the spanning tree algorithm on relatively low cost bridging devices may be prohibitively costly. For example, hardware logic necessary to perform the spanning tree algorithm typically includes a spanning tree state register for each port in a bridge. The value stored in such a state register maintains a current spanning tree state for the associated port. In a bridge device supporting the spanning tree algorithm, a spanning tree state register is necessary for each port in the device, since the value of the register effects forwarding decisions made by the bridge. Accordingly, in a bridge device designed for relatively low cost applications, but containing a significant number of ports, hardware circuitry to provide a spanning tree state register for each port may add undesirable costs to the overall design. Additionally, it may be desirable in some circumstances to limit the network topologies which may be connected to a given port or ports of a relatively low cost bridging device. For example, in the case where a bridging device is designed for relatively small network configurations, it may include a relatively small forwarding table. It would be undesirable for large, complex networks, having large numbers of nodes, to be attached to a port of such a device. Accordingly, it may be desirable to have a system which further operates to prevent the attachment of large, complex networks to one or more ports of a relatively low cost bridging device.

For the reasons stated above, it would be desirable to have a system for avoiding bridge loops and the potential broadcast storms which may result from them, but which does not require the relatively costly implementation of the spanning tree algorithm within a relatively low cost bridge device. The system should further be applicable to bridge devices wishing to limit the types of topologies which are connected to one or more of their external ports.

BRIEF SUMMARY OF THE INVENTION

In accordance with disclosed invention, a system and method are disclosed for detecting and preventing bridge loops in a relatively low cost bridge type device designed for installation within a network hub. The network hub in which the bridge type input/output module is to be installed further includes a switching fabric, which may be integral to the network hub, or removably installed within the network hub. The switching fabric in the network hub is operable to forward data units among a plurality of input/output modules installed in the network hub, including a bridge type input/output module. The switching fabric utilizes an intra-hub communication path to perform forwarding of the data units among the input/output modules installed in the network hub. A spanning tree protocol controller operates on behalf of the switching fabric to forward bridge protocol data units on the intra-hub communication path. The spanning tree protocol controller may be implemented using hardware and/or software components appropriate for a particular embodiment of the system. Accordingly, the spanning tree algorithm functions performed by the spanning tree protocol controller may be performed by some combination of program code executing on an embedded microprocessor subsystem, or hardware circuits such as one or more Application Specific Integrated Circuits (ASICs) within the spanning tree algorithm controller.

One or more of the disclosed bridge type input/output modules may be installed within the network hub. Each bridge type input/output module includes hardware and/or software implemented logic which operates to monitor the intra-hub communication path of the network hub to detect any bridge protocol data units transmitted by the switching fabric. When an initial bridge protocol data unit is detected on the intra-hub communications path by one of the bridge type input/output modules, the bridge type input/output module stores a MAC source address of the data unit, and forwards the data unit onto its external communication ports, which are coupled to respective network segments. The bridge type input/output module then monitors its external communication ports to detect a data unit having a destination address matching the bridge multicast address used to transmit bridge protocol data units.

When a data unit having a destination address matching the bridge multicast address is detected, the bridge type input/output module compares a MAC (Media Access Control) source address of that data unit to the previously stored MAC source address from the bridge protocol data unit detected on the intra-hub communication path. In the event that the MAC source address of the data unit detected on the external communication port matches the previously stored MAC source address, the bridge type input/output module disables operation of the respective one of its external communication ports at which the data unit was received.

In one example of how the disclosed system can be extended, the bridge type input/output device further operates to prevent relatively complex network topologies from being connected to one or more of its external communications ports by monitoring those external communications ports for routing protocol messages. In such an extended system, in the event that a routing protocol message is detected on one of those external communications ports, the bridge type input/output module disables the port. By disabling a port which receives a routing protocol message, this example of an extension to the disclosed system prevents network topologies which include routers, and which therefore are likely to be relatively large and contain many nodes, from being connected to its external ports.

In this way there is provided a system and method for detecting and eliminating bridge loops which are appropriate for use in relatively low cost bridge type input/output modules. The disclosed system does not require the relatively costly implementation of spanning tree algorithm capability within the low cost bridge device. The system is further applicable to bridge devices wishing to limit the types of topologies which are connected to one or more of their external communication ports. The disclosed system may therefore be advantageously employed in bridges which have relatively limited forwarding table resources, in order to reduce the likelihood that very complex networks having large numbers of nodes will be connected to any of the external communications port of the bridge. Additionally, because the disclosed system does not require implementation of the spanning tree algorithm within the bridge, significant savings in terms of hardware and/or software complexity and functionality may be obtained through its use.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION OF THE INVENTION

Figure 1:
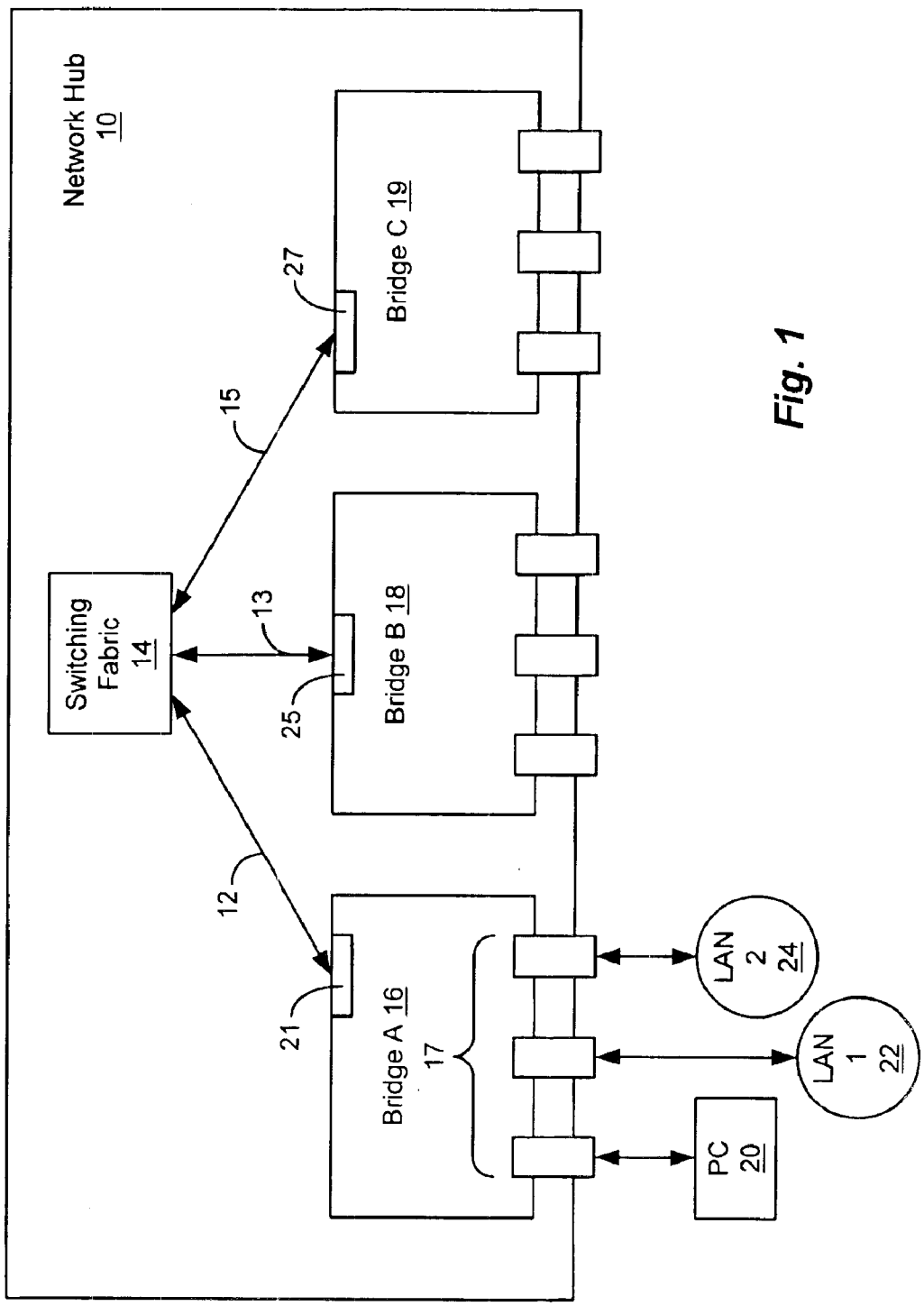
FIG. 1 is a logical block diagram showing a number of bridge type input/output modules within a network hub.

As depicted in FIG. 1, in an illustrative embodiment of the disclosed system, a network hub 10 includes a switching fabric 14, a number of bridge type I/O modules, shown as bridge A 16, bridge B 18 and bridge C 19, and point to point connections 12, 13 and 15 interconnecting the bridge type I/O modules to the switching fabric 14. The point to point connections 12, 13 and 15 each terminate at one of backplane ports 21, 25 and 27 within a respective one of the bridge type I/O modules 16, 18 and 19. In this way, the point to point connections 12, 13 and 15 form a star wired backplane. The star wired backplane illustrated by point to point connections 12, 13 and 15 in FIG. 1 is referred to herein as the "backplane".

Each of the bridge type I/O modules in the network hub 10 of FIG. 1 includes a number of external communication ports, shown as external communication ports 17 in bridge A 16. Each of the external communication ports of the bridges shown in FIG. 1 may be coupled to an end station or respective local area network (LAN) segment. Respective external communication ports of bridge A 16 are shown, for purposes of illustration, coupled to a personal computer 20, and two local area networks (LAN 1 22 and LAN 2 24).

The external communication ports of the bridges shown in FIG. 1 may be implemented to support various communication media and protocols. For example, one or more of the external communication ports 17 in bridge A may support the Ethernet protocol. Further, one or more of the external communication ports 17 in bridge A 16 may support the Token Ring protocol. In general, the external communication ports of the bridges shown in FIG. 1 may be implemented to support any physical media and associated communications protocol for which bridging functionality may be provided.

The bridges within the network hub 10 function, for example, as what are generally referred to as "learning" bridges. Accordingly, the bridges in the network hub 10 operate to forward data units they receive, in cooperation with the switching fabric 14, onto selected ones of their external communication ports, as well as to other bridges within the network hub 10. Consistent with existing bridge protocols, forwarding by the bridges shown in FIG. 1 is performed using the Media Access Control (MAC) layer of addressing information in each data unit. Each of the bridges shown in FIG. 1 employs a forwarding table describing the location of nodes on the network segments to which the bridge is connected. The network topology reflected by such forwarding tables is developed through examination by the bridges of MAC source address information within received data units on their external communication ports.

The switching fabric 14 operates to forward data units among the bridges within the network hub 10. The switching fabric 14 further includes spanning tree algorithm functionality. In this regard, the spanning tree functionality of the switching fabric 14 operates in part to transmit bridge protocol data units (BPDUs) across the backplane, in order for the BPDUs to be transmitted out of the external communication ports of the bridges installed within the network hub 10. For purposes of illustration, the BPDUs generated by the switching fabric 14 follow the format defined in the IEEE 802.1d MAC Bridge Management protocol standard. Accordingly, the BPDUs generated by the switching fabric 14 include a MAC destination address equal to the Bridge Group Address defined for use in BPDUs in connection with IEEE 802.1d. This Bridge Group Address is a multicast address that is recognized by all IEEE 802.1 bridge devices. The switching fabric 14 may further include a network management entity, which is responsible for collecting and reporting status and maintenance information related to the network hub 10.

The switching fabric and bridges of FIG. 1 may be implemented using hardware and/or software based control logic. For example, each of the switching fabric and the bridges of FIG. 1 may include a high speed path for data unit forwarding, implemented primarily in hardware, that is designed to maintain a relatively high data unit throughput. Additionally, the switching fabric and the bridges of FIG. 1 may each include a lower speed data unit processing path, for example implemented using software or microcode executing on a microprocessor based subsystem, for handling network management and other relatively low throughput functions.

The backplane which serves as an intra-hub communications path in the illustrative embodiment of FIG. 1 may be implemented using any appropriate backplane interconnection technology which permits digitized data to be communicated between the various bridge input/output modules and the switching fabric 14. In this regard, each of the bridges and the switching fabric in the network hub 10 includes interface logic, associated with the respective one of the backplane ports 21, 25 and 27, which is operable to receive and transmit information using the backplane, such as the backplane consisting of point to point connections 12, 13 and 15 shown in FIG. 1.

Figure 2:
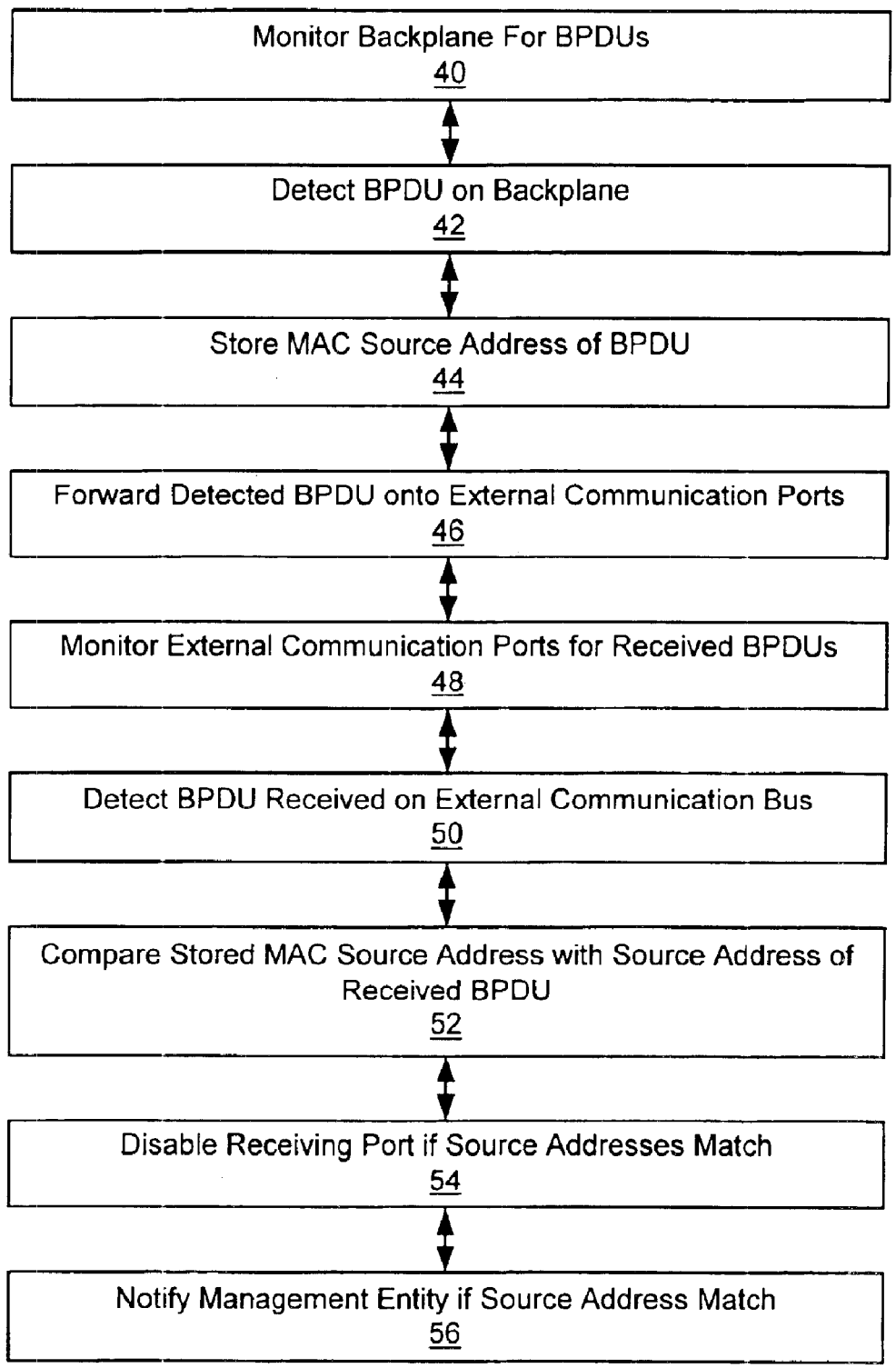
FIG. 2 is a flow chart illustrating steps performed by an illustrative embodiment of the disclosed system.

FIG. 2 illustrates steps performed in connection with an embodiment of the disclosed system. A bridge input/output module, such as the bridge input/output module 16 of FIG. 1, monitors a backplane within a network hub, such as the star wired backplane shown in FIG. 1, for one or more bridge protocol data units transmitted from the switching fabric 14 within the network hub 10, as shown in FIG. 1. For example, detection of bridge protocol data units may be performed at each respective one of the backplane ports 21, 15 and 27 (FIG. 1) by comparing the MAC layer destination address of a data unit with a predetermined destination address, such as the Bridge Group Address associated with IEEE 802.1. When a data unit is detected on the backplane having a MAC destination address equal to such a predetermined destination address, the bridge input/output module determines that the data unit is a bridge protocol data unit, as shown in step 42.

Next, at step 44, the backplane port of the bridge input/output module stores the MAC source address of the bridge protocol data unit detected at step 42. In the case where the switching fabric of the network hub is the entity within the network hub that is transmitting bridge protocol data units over the backplane, the stored MAC source address is the MAC address of the switching fabric within the network hub. Alternatively, in the case where the spanning tree algorithm is disabled within the switching fabric, the switching fabric simply passes bridge protocol data units generated from another source onto the backplane. In either case, the stored MAC source address is copied by the respective one of the backplane ports from one or more bridge protocol data units transmitted over the backplane.

After the bridge input/output module stores the MAC source address at step 42, the bridge input/output module forwards the detected bridge protocol data unit through its external communication ports to the network segments to which it is connected at step 46.

The bridge input/output module monitors its external communication ports, as shown by step 48 of FIG. 2, to detect any bridge protocol data units received at those external communication ports. When the bridge input/output module detects a bridge protocol data unit at one of its external communication ports during step 50, it extracts the source MAC address of that detected bridge protocol data unit, and compares the extracted source MAC address with MAC address of the bridge protocol data unit detected at step 42 on the backplane of the network hub. If the extracted MAC source address is determined to match the MAC address of the bridge protocol data unit detected on the backplane, then the bridge input/output module has detected an apparent loop in the network topology connected to the external communications port at which the bridge protocol data unit was detected at step 50. Accordingly, during step 54, the bridge input/output device disables operation of the external communications port at which the bridge protocol data unit was detected at step 50. In this way, the bridge input/output module breaks the loop that it has detected in the network topology connected to that external communications port. Additionally, the bridge input/output module discards the bridge protocol data unit detected at step 50 in the case where the MAC source address of the bridge input/output module detected at step 50 matches the MAC address of the bridge protocol data unit detected on the backplane, such that it is not forwarded over any of the external communication ports of the bridge input/output module or the backplane of the network hub.

The disabling performed at step 54 may be performed in a variety of specific ways. Any type of disabling mechanism may be used that is effective in breaking the detected bridge loop. For example, the bridge input output module may operate to turn off or shut down the communications port such that no data units may be received or transmitted with regard to that port. A communications port that has been shut down may subsequently be re-enabled through an appropriate network management system.

At step 56 the bridge input/output module notifies a management entity regarding the disabling of the communications port at step 54. For example, the bridge input/output module passes a Simple Network Management Protocol (SNMP) message to a management entity associated with the network hub. Such a management entity may, for example, consist of software executing on the switch fabric within the network hub. The notification may be passed through any appropriate communications mechanism, for example by way of the backplane within the network hub.

In order to maintain a correct value of the source MAC address stored at step 44, the bridge input/output module may, in an illustrative embodiment, clear the stored value periodically. After the stored value is cleared, the bridge input/output module then operates to detect a subsequent bridge protocol data unit transmitted over the backplane, and to store the MAC source address of that data unit.

The present system may be extended to further limit the types of network topologies which may be connected to the external communication ports of the bridge input/output module. For example, the disclosed system may be extended such that one or more of the external communication ports of the bridge input/output module are configured to monitor data units it receives for router protocol data units. Illustrative routing protocols include the RIP (Routing Information Protocol) layer 4 protocol, which uses the well known UDP (User Datagram Protocol) port 520, and OSPF (Open Shortest Path First) protocol, which uses an IP protocol ID of 89. In the event a router protocol data unit is detected at one of the external communication ports of the bridge input/output module, the bridge input/output module operates to disable that communication port, and to notify an associated management entity that the communication port has been disabled. This feature effectively prevents a router device from being connected to a network segment which is coupled to one of the external communication ports of the bridge input/output module. Since connection of a router to a network segment is typically an indication of a larger, more complex network topology for that network segment, preventing connection of a router effectively limits the complexity of the network segment. Since a less complex network segment will generally involve fewer nodes, the number of nodes which must be supported by the bridge input/output module for the associated external communication port is thereby effectively reduced in many cases.

Those skilled in the art should readily appreciate that the programs defining the functions of the bridge input/output module and switching fabric of the disclosed network hub can be implemented in and delivered to a specific embodiment of the disclosed system in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the functionality of the bridge input/out modules and/or switching fabric may be embodied in computer software, these functions may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

What is claimed is:

1. A method for preventing bridge loops in a network topology, comprising:
    monitoring an intra-hub communication path of a network hub to detect a first data unit on said intra-hub communication path having a destination address matching a first predetermined address, wherein said first predetermined address is a media access control layer bridge multicast address;
    storing a source MAC address of said detected first data unit;
    forwarding said detected first data unit onto a plurality of external communication ports;
    monitoring said plurality of external communication ports to detect a second data unit having a destination address matching said first predetermined address received at a respective one of said plurality of external communication ports;
    comparing a source MAC address of said second detected data unit to said stored source MAC address; and
    in the event that said source MAC address of said second detected data unit matches said stored source MAC address, disabling operation of said respective one of said plurality of external communication ports at which said second detected unit was received.

2. The method of claim 1, further comprising discarding said detected second data unit without any forwarding of said detected second data unit over any of said plurality of external communication ports.

3. The method of claim 1, further comprising sending a message to a network management entity indicating that said one of said plurality of external communication ports has been disabled.

4. The method of claim 3, wherein said sending of said massage comprises sending said message to a network management entity within said network hub.

5. The method of claim 1, wherein said detected first data unit and said detected second data unit are bridge protocol data units.

6. The method of claim 1, further comprising periodically clearing said stored copy of said source MAC address of said detected first data unit.

7. The method of claim 1, further comprising:
    monitoring said plurality of external communication ports to detect a data unit of a predetermined type; and
    in the event that a data unit is detected of said, predetermined type, disabling a respective one of said plurality of external communication ports at which said detected data unit of said predetermined type was received.

8. The method of claim 7, wherein said step of monitoring said plurality of external communication ports to detect a data unit of said predetermined type comprises monitoring said plurality of external communication ports to detect a router protocol data unit.

9. Apparatus for eliminating loops in a network comprising:
    a bridge type input/output module having a plurality of external communication ports and an intra-hub interface for communicably coupling said module with a switching fabric within a network hub, said input/output module including a controller operable to:
        monitor said intra-hub interface to detect a first data unit having a destination address matching a first, predetermined address, wherein said first predetermined address is a media access control layer bridge multicast address;

store a source MAC address of said detected first data unit;

forward said detected first data unit onto said plurality of external communication ports;

monitor said plurality of external communication ports to detect a second data unit received at a respective one of said plurality of external communication ports and having a destination address matching said first predetermined address;

compare a source MAC address of said second detected data unit to said stored source MAC address; and in the event that said source MAC address of said second detected data unit matches said stored source MAC address, disable operation of said respective one of said plurality of external communication ports at which said second detected unit was received.

10. The apparatus of claim 9, wherein said bridge type input/output module is further operable to discard said detected second data unit without any forwarding of said detected second data unit over any of said plurality of external communication ports.

11. The apparatus of claim 9, wherein said bridge type input/output module is further operable to send a message to a network management entity, said message indicating that said one of said plurality of external communication ports has been disabled.

12. The apparatus of claim 11, wherein said bridge type input/output module is further operable to send said message by sending said message to a network management entity within said network hub.

13. The apparatus of claim 9, wherein said detected first data unit and said detected second data unit are bridge protocol data units.

14. The apparatus of claim 9, wherein said bridge type input/output module is further operable to periodically clear said stored copy of said source MAC address of said detected first data unit.

15. The apparatus of claim 9, wherein said bridge type input/output module is further operable to:

monitor said plurality of external communication ports to detect a data unit of a predetermined type; and in the event that a data unit is detected of said predetermined type, disable a respective one of said plurality of external communication ports at which said detected data unit of said predetermined type was received.

16. The apparatus of claim 15, wherein said bridge type input/output module is further operable to monitor said plurality of external communication ports to detect a data unit of said predetermined type by monitoring said plurality of external communication ports to detect a router protocol data unit.

17. A system for preventing bridge loops in a network topology, comprising:

a switching fabric installed in a network hub, said switching fabric operable to forward data units among a plurality of input/output modules also installed in said network hub;

a spanning tree protocol controller installed within said switching fabric, said spanning tree protocol controller operable to forward bridge protocol data units on an intra-hub communication path;

at least one bridge type input/output module installed in said network hub, said bridge type input/output module operable to monitor said intra-hub communication path of said network hub to detect a first one of said bridge protocol data units transmitted by said switching fabric and having a destination address matching a first predetermined address, wherein said first predetermined address is a media access control layer bridge multicast address, store a source MAC address of said detected first data unit, forward said detected first data unit onto a plurality of external communication ports of said bridge type input/output module, monitor said plurality of external communication ports to detect a second data unit having a destination address matching said first predetermined address received at a respective one of said plurality of external communication ports, compare a source MAC address of said second detected data unit to said stored source MAC address, and in the event that said source MAC address of said second detected data unit matches said stored source MAC address, disabling operation of said respective one of said plurality of external communication ports at which said second detected unit was received.

18. The system of claim 17, wherein said at least one bridge type input/output module installed in said network hub is further operable to discard said detected second data unit without any forwarding of said detected second data unit over any of said plurality of external communication ports.

19. The system of claim 17, wherein said at least one bridge type input/output module installed in said network hub is further operable to send a message to a network management entity indicating that said one of said plurality of external communication ports has been disabled.

20. The system of claim 19, wherein said at least one bridge type input/output module installed in said network hub is operable to send said message by sending said message to a network management entity within said network hub.

21. The system of claim 17, wherein said detected first data unit and said detected second data unit are bridge protocol data units.

22. The system of claim 17, wherein said at least one bridge type input/output module installed in said network hub is further operable to periodically clear said stored copy of said source MAC address of said detected first data unit.

23. The system of claim 17, wherein said at least one bridge type input/output module installed in said network hub is further operable to:

monitor said plurality of external communication ports to detect a data unit of a predetermined type; and in the event that a data unit is detected of said predetermined type, disable a respective one of said plurality of external communication ports at which said detected data unit of said predetermined type was received.

24. The system of claim 23, wherein said at least one bridge type input/output module installed in said network hub is operable to monitor said plurality of external communication ports to detect a data unit of said predetermined type comprises by monitoring said plurality of external communication ports to.

* * * * *